United States Patent [19]

Phillion et al.

[11] Patent Number: 5,584,502
[45] Date of Patent: Dec. 17, 1996

[54] DEPLOYMENT DOOR ASSEMBLY

[75] Inventors: Jack A. Phillion, Shelby Township; Thomas J. Hawkins, Kentwood, both of Mich.

[73] Assignee: TRW Vehicle Safety Systems Inc., Lyndhurst, Ohio

[21] Appl. No.: 531,422

[22] Filed: Sep. 21, 1995

[51] Int. Cl.$^6$ ........................... B60R 21/20
[52] U.S. Cl. .................... 280/728.3; 280/732
[58] Field of Search ............. 280/728.3, 728.2, 280/732, 731, 730.1, 728.1, 752

[56] References Cited

U.S. PATENT DOCUMENTS

| | | | |
|---|---|---|---|
| 5,082,310 | 1/1992 | Bauer | 280/732 |
| 5,087,067 | 2/1992 | Seki et al. | 280/732 |
| 5,154,444 | 10/1992 | Nelson | 280/732 |
| 5,158,322 | 10/1992 | Sun | 280/732 |
| 5,322,324 | 6/1994 | Hansen et al. | 280/732 |
| 5,330,223 | 7/1994 | Hiramitsu et al. | 280/728.3 |
| 5,333,901 | 8/1994 | Barnes | 280/732 |
| 5,335,935 | 8/1994 | Proos et al. | 280/728.3 |
| 5,338,060 | 8/1994 | Soderquist | 280/728.3 |
| 5,342,082 | 8/1994 | Kriska et al. | 280/728.2 |
| 5,375,874 | 12/1994 | Zushi | 280/728.3 |
| 5,378,014 | 1/1995 | Cooper | 280/728.3 |
| 5,403,033 | 4/1995 | Koma | 280/728.2 |
| 5,431,436 | 7/1995 | Mossi et al. | 280/732 |
| 5,460,400 | 10/1995 | Davidson | 280/728.2 |
| 5,482,313 | 1/1996 | Ikeya et al. | 280/728.3 |

FOREIGN PATENT DOCUMENTS

| | | | |
|---|---|---|---|
| 2-306846 | 12/1990 | Japan | 280/728.2 |
| 4-325345 | 11/1992 | Japan | 280/728.3 |
| 2265119 | 9/1993 | United Kingdom . | |
| 2265338 | 9/1993 | United Kingdom | 280/728.3 |
| 2264677 | 9/1993 | United Kingdom | 280/728.3 |

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

A deployment door assembly (30) covers an inflatable air bag (12) in a vehicle. The deployment door assembly (30) is a part which has a panel portion (32) and a base portion (36). The panel portion (32) has a peripheral edge surface (74), and includes a deployment door (34) which is spaced fully from the peripheral edge surface (74). The base portion (36) directs the inflating air bag (12) to move outward toward the deployment door (34). The base portion (36) includes corrugated walls (180–186) which surround the deployment door (34) and project inward from the panel portion (32).

8 Claims, 5 Drawing Sheets

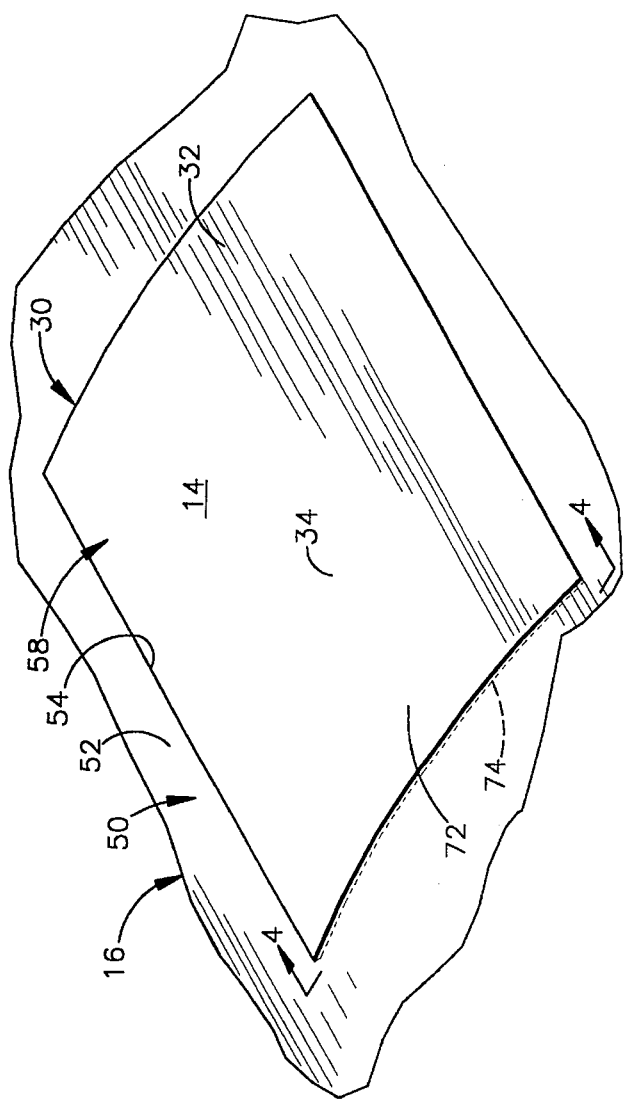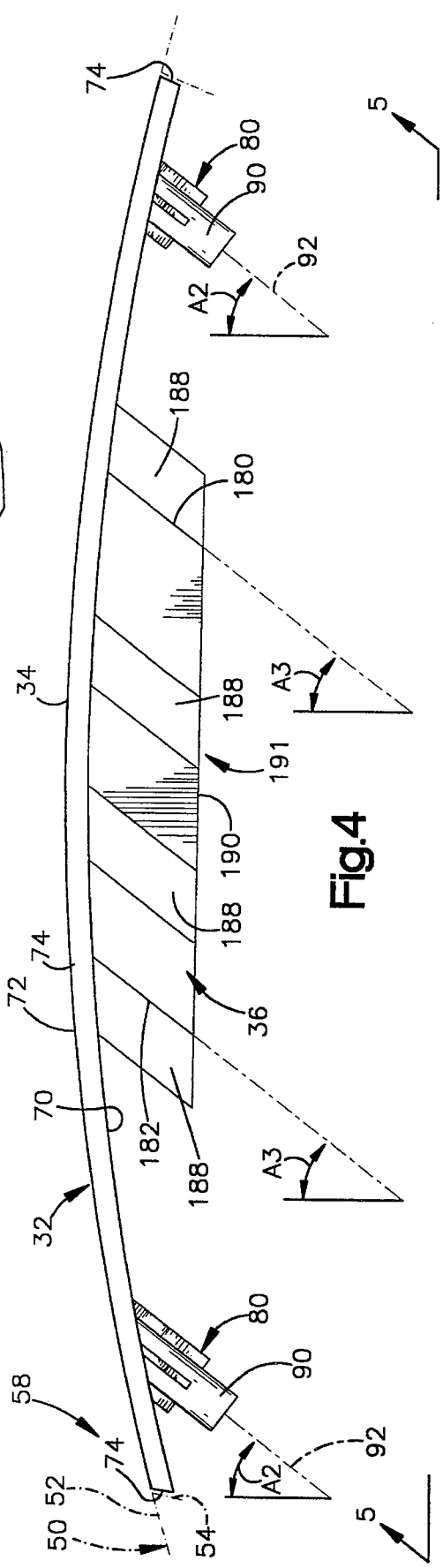

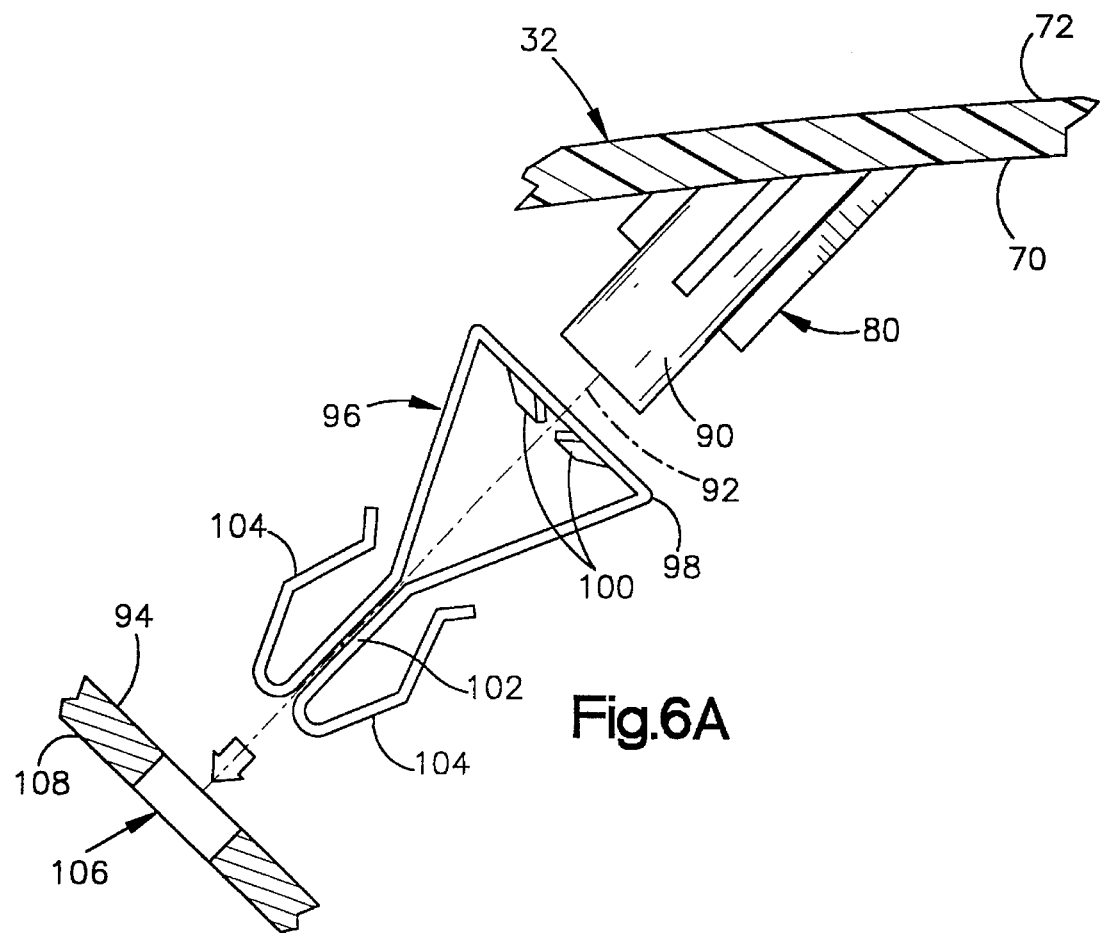
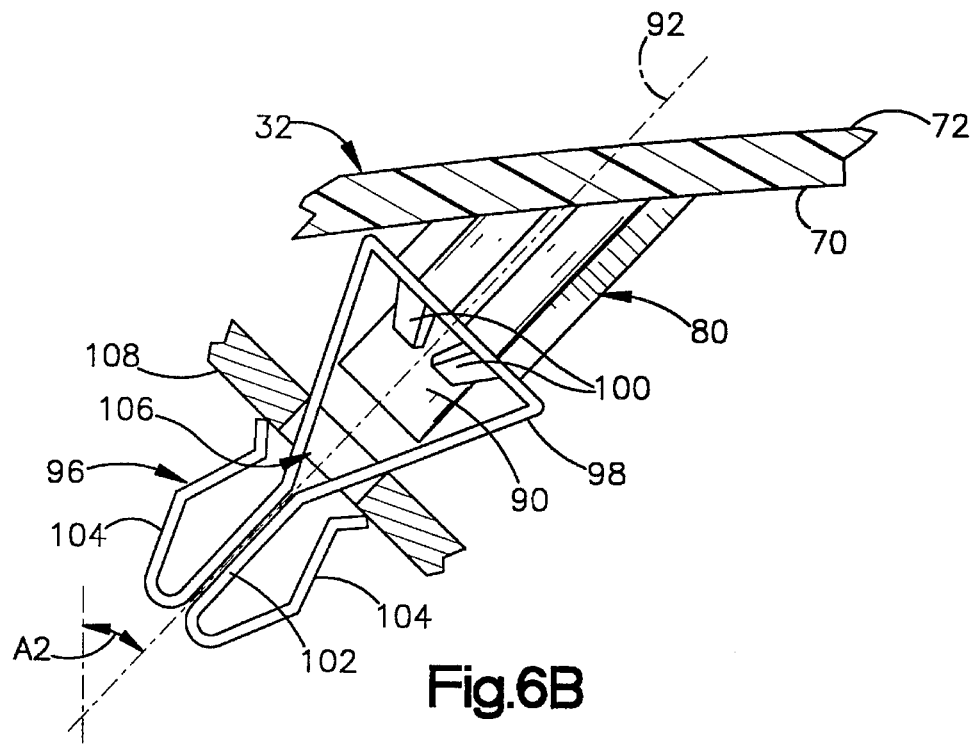

1

DEPLOYMENT DOOR ASSEMBLY

FIELD OF THE INVENTION

The present invention relates to a deployment door which is opened upon inflation of an air bag in a vehicle.

BACKGROUND OF THE INVENTION

An air bag is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag. The inflation fluid inflates the air bag to an inflated condition in which the air bag extends into the vehicle occupant compartment. When the air bag is inflated into the vehicle occupant compartment, it restrains the occupant of the vehicle from forcefully striking parts of the vehicle as a result of the collision.

The air bag and the inflator are typically assembled together as parts of an air bag module which is mounted in the vehicle. In addition to the air bag and the inflator, the module includes a reaction canister which contains the air bag and the inflator. The reaction canister has a deployment opening through which the air bag emerges from the reaction canister when the air bag is inflated.

A deployment door extends over the deployment opening in the reaction canister to conceal the air bag and the other parts of the module from the vehicle occupant compartment. The deployment door may be a part of the nodule. Alternatively, the deployment door may be a part of a trim panel on the vehicle structure in which the module is mounted. For example, the deployment door may be a part of a trim panel on the vehicle instrument panel.

When the inflator is actuated, the reaction canister directs the inflation fluid to flow from the inflator into the air bag. As the inflation fluid enters the air bag, it moves the air bag outward from the reaction canister through the deployment opening and forcefully against the deployment door. The deployment door is ruptured by the force of the fluid pressure in the air bag, and is thus released for movement away from the deployment opening. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag inflates outward from the reaction canister through the deployment opening and into the vehicle occupant compartment.

SUMMARY OF THE INVENTION

The present invention comprises a deployment door assembly for covering an inflatable occupant restraint in a vehicle. In accordance with the present invention, the deployment door assembly comprises a part having a panel portion and a base portion.

The panel portion of the part has a peripheral edge surface, and includes means for defining boundaries of a deployment door which is spaced fully from the peripheral edge surface.

The base portion of the part comprises means for directing the inflatable restraint to move outward toward the deployment door when the inflatable restraint is inflating. The base portion is defined by a plurality of corrugated base walls which surround the deployment door and project inward from the panel portion.

In a preferred embodiment of the present invention, the base portion of the part defines a chute through which the inflatable restraint moves outward toward the deployment door. The chute has an open inner end which is spaced from the panel portion. Each of the base walls has a plurality of corrugations extending inward from the panel portion toward the open inner end of the chute. The base portion thus intersects the panel portion along an undulating path extending around the deployment door. This structure stiffens the panel portion about the perimeter of the deployment door so as to resist undesirable bending of the panel portion when the inflatable restraint moves outward against the deployment door.

BRIEF DESCRIPTION OF THE DRAWINGS

Further features of the present invention will become apparent to those skilled in the art to which the present invention relates from reading the following description with reference to the accompanying drawings, in which:

FIG. 3 is a perspective view of parts shown in FIG. 1;

FIG. 4 is a view taken on line 4—4 of FIG. 3;

FIGS. 6A and 6B are partial side views showing parts of the apparatus of FIG. 1;

DESCRIPTION OF A PREFERRED EMBODIMENT

Figure 1:
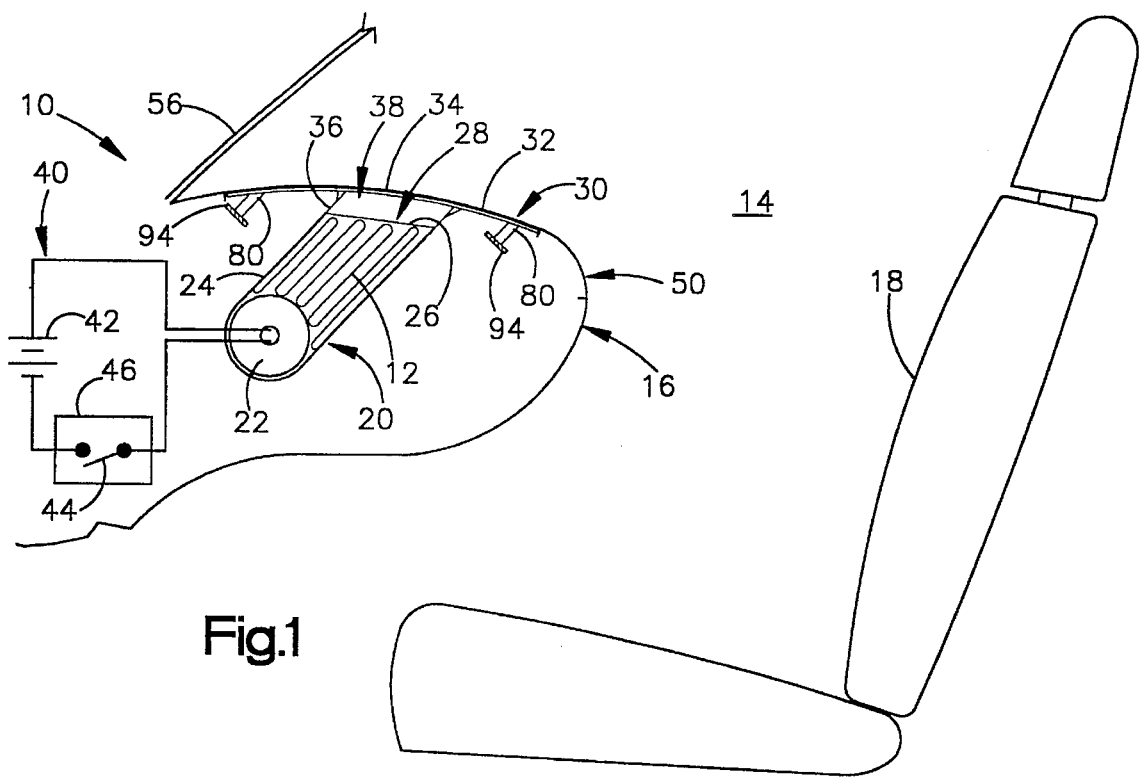
FIG. 1 is a schematic view of a vehicle occupant restraint apparatus comprising a preferred embodiment of the present invention.
Figure 2:
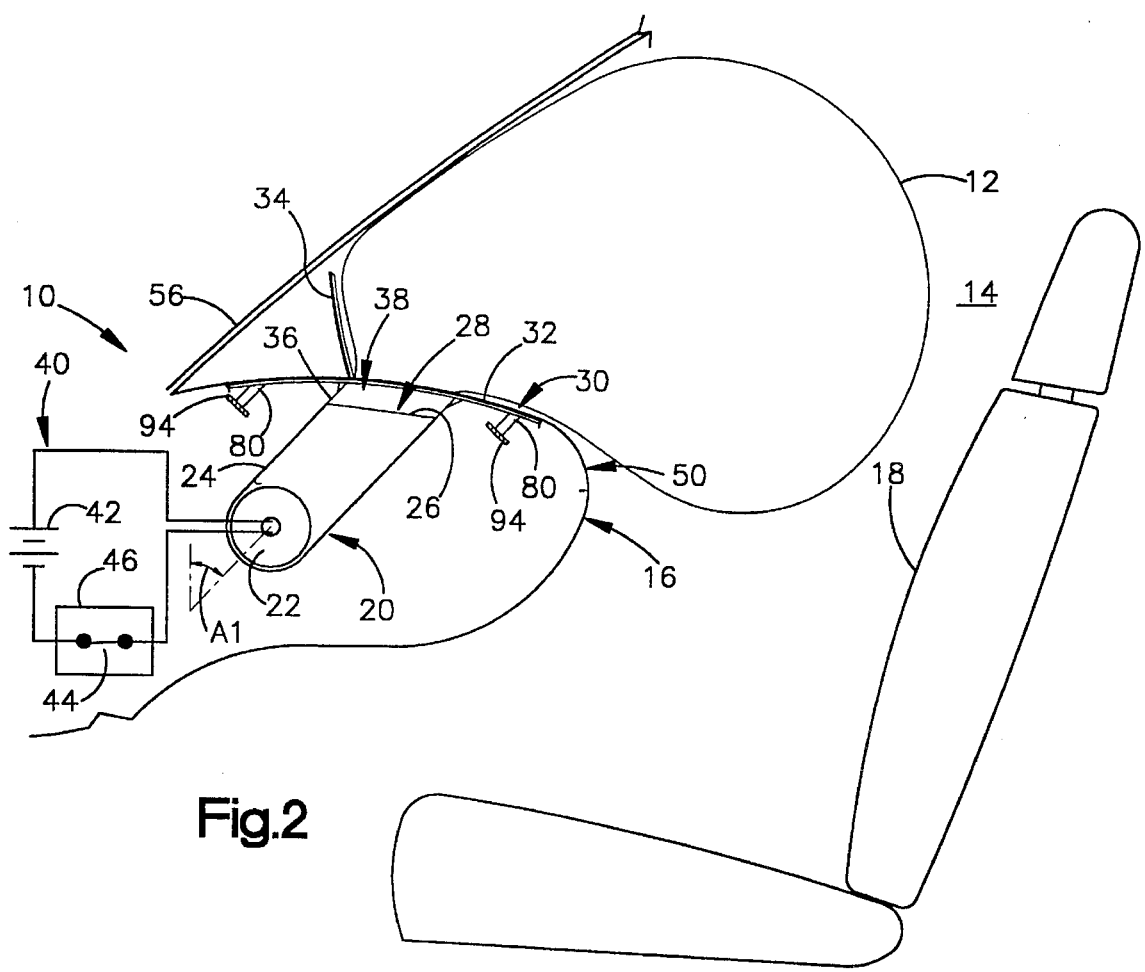
FIG. 2 is a schematic view showing the apparatus of FIG. 1 in an actuated condition.

As shown schematically in FIGS. 1 and 2, a vehicle occupant restraint apparatus 10 comprising a preferred embodiment of the present invention includes an inflatable vehicle occupant restraint 12, which is commonly referred to as an air bag. The air bag 12 is inflatable from an uninflated condition, as shown in FIG. 1, to an inflated condition, as shown in FIG. 2. When the air bag 12 is inflated, it moves into the vehicle occupant compartment 14 between the vehicle instrument panel 16 and an adjacent vehicle seat 18. The air bag 12 then restrains movement of an occupant of the seat 18 toward the instrument panel 16 to help protect the occupant from a forceful impact with the instrument panel 16 or other parts of the vehicle.

The air bag 12 is part of an air bag module 20 which is mounted in the instrument panel 16 at the passenger side of the vehicle. In addition to the air bag 12, the module 20 includes an inflator 22 for inflating the air bag 12, and includes a reaction canister 24 which contains the air bag 12 and the inflator 22. The air bag 12 and the inflator 22 are fixed to the reaction canister 24 in a known manner, and the reaction canister 24 is mounted in the instrument panel 16 in a known manner. An outer end 26 of the reaction canister 24 is open so as to define a deployment opening 28 through which the air bag 12 emerges from the reaction canister 24 when inflating. Although the reaction canister 24 in the preferred embodiment of the present invention is a separate structure which is mounted in the instrument panel 16, such a canister could alternatively be defined by the structure of the instrument panel 16, or by another part of the vehicle from which the air bag 12 is to be inflated into the vehicle occupant compartment 14.

The apparatus 10 further includes a deployment door assembly 30 which is mounted on the instrument panel 16. The deployment door assembly 30 is a part which is preferably defined by a single continuous piece of plastic material. The plastic material of which the deployment door assembly 30 is formed may have any suitable composition known in the art.

The deployment door assembly 30 includes a deployment panel 32 with a deployment door 34. The deployment panel 32 covers the module 20 to conceal the module 20 from the vehicle occupant compartment 14. The deployment door 34 is pivotal from a closed position, as shown in FIG. 1, to an opened position, as shown in FIG. 2. A base 36 of the deployment door assembly 30 projects inward from the deployment panel 32 to the module 20. The base 36 defines a chute 38 through which the inflating air bag 12 moves from the deployment opening 28 to the deployment door 34.

The inflator 22 comprises a source of inflation fluid for inflating the air bag 12. As known in the art, the inflator 22 may contain an ignitable gas generating material which, when ignited, rapidly generates a large volume of gas. The inflator 22 may alternatively contain a stored quantity of pressurized inflation fluid, or a combination of pressurized inflation fluid and ignitable material for heating the inflation fluid.

The inflator 22 is included in an electrical circuit 40. The electrical circuit 40 further includes a power source 42, which is preferably the vehicle battery and/or a capacitor, and a normally open switch 44. The switch 44 is part of a sensor 46 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 12 is desired to protect an occupant of the vehicle. The sensor 46 then closes the switch 44, and the inflator 22 is actuated electrically.

When the inflator 22 is actuated, it emits a large volume of inflation fluid into the reaction canister 24. The reaction canister 24 directs the inflation fluid from the inflator 22 into the air bag 12 to inflate the air bag 12. As the air bag 12 begins to inflate, it moves rapidly outward through the chute 38 and forcefully against the deployment door 34. The air bag 12 then pivots the deployment door 34 outward from the closed position to the opened position. As the air bag 12 continues to inflate, it moves outward into the vehicle occupant compartment 14 past the deployment door 34.

In the preferred embodiment of the present invention shown in FIGS. 1 and 2, the air bag module 20 is mounted in the instrument panel 16 in an arrangement known as a top mount. The air bag 12 is thus inflated outward from an upper portion 50 of the instrument panel 16 which is known as a topper pad. As shown in FIG. 3, the topper pad 50 has an upper surface 52 and an inner edge surface 54. The upper surface 52 faces upward into the vehicle occupant compartment 14, and thus faces partially toward the vehicle windshield 56 (FIGS. 1 and 2). The inner edge surface 54 defines a rectangular opening 58. The deployment panel 32 on the deployment door assembly 30 also is rectangular, and extends fully across the opening 58 in the topper pad 50 to continue the contour of the topper pad 50 across the opening 58. The deployment door 34 thus faces partially toward the windshield 56. More specifically, the air bag 12 is inflated at a deployment angle A1 (FIG. 2), which is measured from a vertical line and which directs the air bag 12 into contact with the windshield 56. Tethers or the like (not shown) can be used to control interaction of the inflating air bag 12 with the windshield 56 in any suitable manner known in the art.

As best shown in FIG. 4, the deployment panel 32 has oppositely facing inner and outer side surfaces 70 and 72 bounded by a peripheral edge surface 74. The inner and outer side surfaces 70 and 72 have substantially the same size, shape, and contour. As a result, the deployment panel 32 has a substantially constant thickness between the inner and outer side surfaces 70 and 72. The peripheral edge surface 74 of the deployment panel 32 is shaped to mate with the surrounding inner edge surface 54 of the topper pad 50, as indicated in FIGS. 3 and 4. The outer side surface 72 extends fully across the opening 58 in the topper pad 50. Additionally, the texture and/or the color of the outer side surface 72 is preferably complementary to that of the surrounding surface 52 of the topper pad 50. The outer side surface 72 thus continues the trim theme of the topper pad 50 across the opening 58. In accordance with this feature of the present invention, the plastic material of the deployment door assembly 30 may have the same composition as the plastic material of the topper pad 50.

Figure 5:
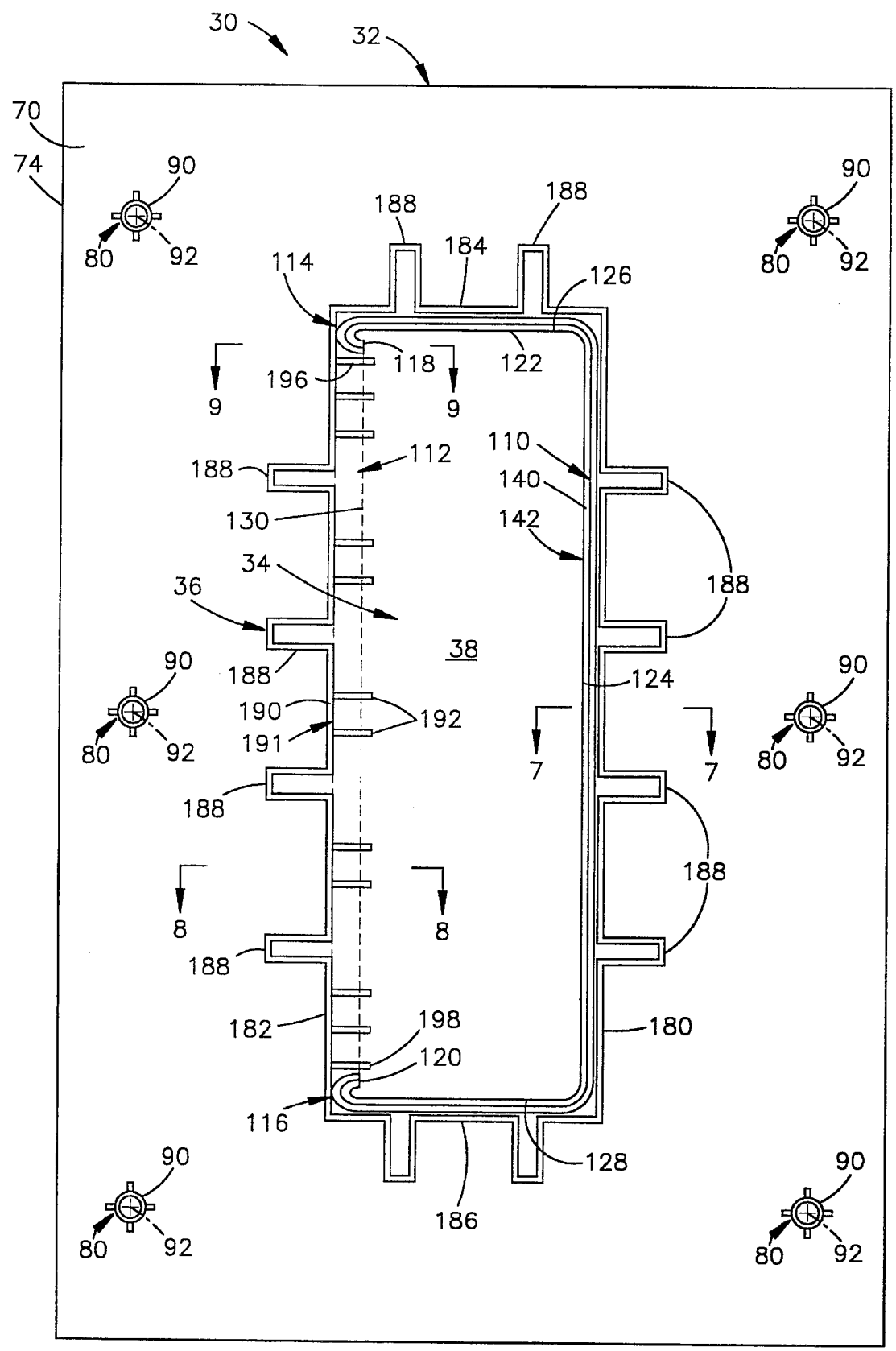
FIG. 5 is a view taken on line 5—5 of FIG. 4.
Figure 8:
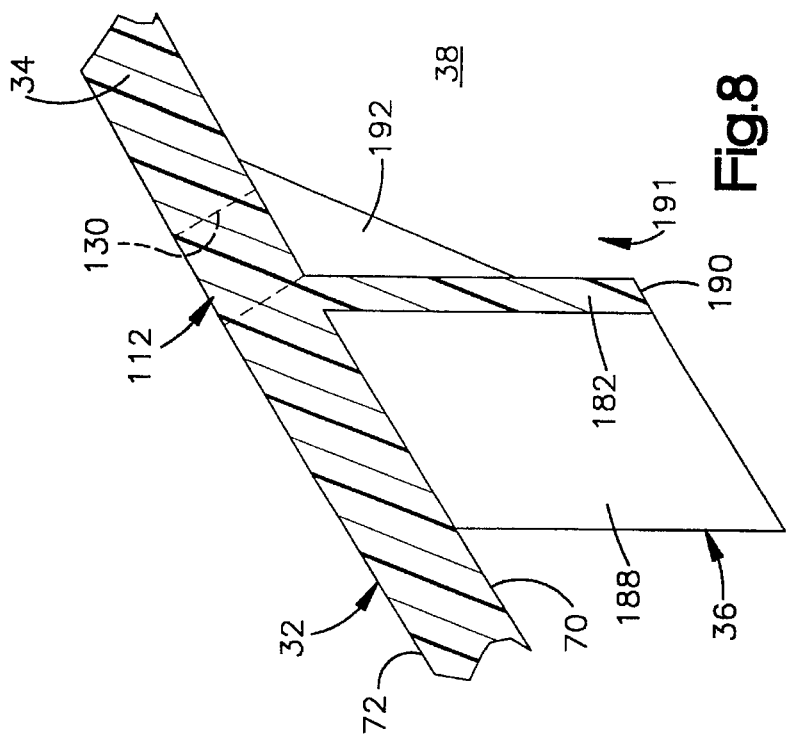
FIG. 8 is a view taken on line 8—8 of FIG. 5.

As shown in FIGS. 4 and 5, a plurality of mounting bosses 80 project inward from the deployment panel 32 at locations between the base 36 and the peripheral edge surface 74. The mounting bosses 80 are integral portions of the deployment panel 32, and project inward from the inner side surface 70 of the deployment panel 32. Each mounting boss 80 has a cylindrical outer surface 90 centered on a respective axis 92. The axes 92 are parallel to each other. When the deployment door assembly 30 is mounted on the instrument panel 16, as shown in FIG. 4, each axis 92 is inclined from a vertical line at an angle A2. The angles A2 are equal to each other, and are equal to the deployment angle A1 (FIG. 2) of the air bag 12.

The deployment door assembly 30 is fastened to portions 94 of the instrument panel 16 which are spaced from the reaction canister 24, as shown in FIG. 1. Each mounting boss 80 is fastened directly to a corresponding portion 94 of the instrument panel 16 by a corresponding fastener 96, as shown in FIGS. 6A and 6B. Each fastener 96 has a head 98 with a plurality of barbs 100, and has a stem 102 with a pair of spring arms 104.

When the head 98 of a fastener 96 is received over the corresponding mounting boss 80, as shown in FIG. 6B, the barbs 100 cut into the mounting boss 80 at the cylindrical outer surface 90 so as to block removal of the fastener 96 from the mounting boss 80. The stem 102 of the fastener 96 is receivable through an aperture 106 in the corresponding portion 94 of the instrument panel 16, as indicated by the arrow shown in FIG. 6A. When the stem 102 is moved through the aperture 106, the spring arms 104 are first deflected toward each other, and subsequently move resiliently away from each other to the positions in which they are shown in FIG. 6B. The spring arms 104 then engage an inner surface 108 of the corresponding portion 94 of the instrument panel 16 so as to block removal of the stem 102 from the aperture 106. Each fastener 96 fastens the corresponding mounting boss 80 securely to the instrument panel 16 in this manner. Although the foregoing structures of the mounting bosses 80 and the fasteners 96 are preferred, any suitable alternative structures may be used.

As best shown in FIG. 5, the deployment door 34 has a generally rectangular peripheral shape and is located at the center of the deployment panel 32. The deployment door 34 could be offset from the center of the deployment panel 32, depending upon considerations such as the orientation of the topper pad 50 relative to the vehicle occupant compartment 14, and/or the deployment angle A1 (FIG. 2) of the air bag 12. In any case, the deployment door 34 is spaced fully from the peripheral edge surface 74 of the deployment panel 32.

The peripheral shape of the deployment door 34 is defined by a stress riser 110 and a hinge 112 which together extend fully around the perimeter of the deployment door 34. The stress riser 110 has first and second opposite end portions 114 and 116. The opposite end portions 114 and 116 extend along semi-circular, hook-shaped paths to respective opposite terminal ends 118 and 120 of the stress riser 110. A major portion 122 of the stress riser 110 extends between the end portions 114 and 116 in a U-shaped path extending along three sides of the deployment door 34. The major portion 122 of the stress riser 110 thus defines one long side 124 and two short sides 126 and 128 of the deployment door 34. The hinge 112 extends in a straight line between the opposite end portions 114 and 116 of the stress riser 110. The hinge 112 thus defines another long side 130 of the deployment door 34.

Figure 7:
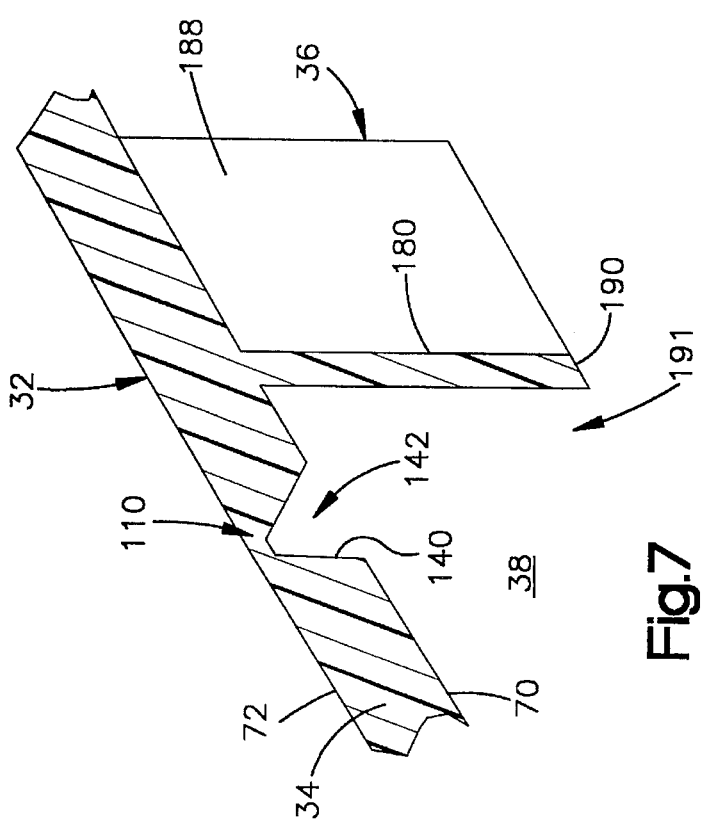
FIG. 7 is a view taken on line 7—7 of FIG. 5.

The stress riser 110 is defined by surfaces of the deployment panel 32. As best shown in FIG. 7, a recessed surface 140 of the deployment panel 32 defines a groove 142. The groove 142 extends along the entire length of the stress riser 110, and has a depth extending from the inner side surface 70 of the deployment panel 32 toward the outer side surface 72. The stress riser 110 comprises the relatively thin plastic material of the deployment panel 32 which is located between the recessed surface 140 and the outer side surface 72. Importantly, the contour of the outer side surface 72 is not affected by the structure of the stress riser 110. The outer side surface 72 thus extends fully across and around the deployment door 34 without interruption at the boundaries of the deployment door 34, as shown in FIG. 3, so that the outline of the deployment door 34 is not visible from the vehicle occupant compartment 14.

As noted above, the base 36 projects inward from the deployment panel 32. The base 36 has a generally rectangular peripheral shape defined by a pair of side walls 180 and 182 and a pair of end walls 184 and 186. Each of the walls 180, 182, 184 and 186 of the base 36 has a plurality of corrugations 188 extending inward from the deployment panel 32. The corrugations 188 are preferably rectangular, as best shown in FIG. 5. One side wall 180 extends closely alongside the stress riser 110 adjacent to the first long side 124 of the deployment door 34. The other side wall 182 extends closely alongside the hinge 112 adjacent to the second long side 130 of the deployment door 34. The end walls 184 and 186 extend closely alongside the stress riser 110 at the short sides 126 and 128, respectively, of the deployment door 34. Accordingly, the base 36 closely surrounds the deployment door 34, the stress riser 110, and the hinge 112. A lower edge surface 190 of the base 36 defines an opening 191 which extends fully across the base 36. The opening 191 defines an inner end of the chute 38.

When the deployment door assembly 30 is mounted on the instrument panel 16 (FIG. 4), the end walls 184 and 186 of the base 34 are substantially vertical. However, each of the side walls 180 and 182 is inclined from a vertical plane at an angle A3. The angles A3 are equal to each other, and are equal to the deployment angle A1 (FIG. 2) of the air bag 12.

The deployment door assembly 30 further includes a plurality of triangular gussets 192 extending between the deployment panel 32 and the base 36. The gussets 192 extend across the hinge 112 and are perpendicular to the hinge 112. A first gusset 196 adjoins the first hook-shaped end portion 114 of the stress riser 110. A second gusset 198 likewise adjoins the second hook-shaped end portion 116 of the stress riser 110.

When the air bag 12 is inflated upon the occurrence of a vehicle collision, as described above with reference to FIGS. 1 and 2, the base 36 of the deployment door assembly 30 directs the air bag 12 to move outward through the chute 38 from the deployment opening 28 to the deployment door 34. As the air bag 12 inflates and expands outward through the chute 38, the surrounding walls 180–186 of the base 36 constrain the air bag 12 to remain substantially within the perimeter of the deployment door 34. The air bag 12 is thus directed to move against the inner side surface 70 of the deployment panel 32 at the deployment door 34. The inflation fluid in the air bag 12 then causes the air bag 12 to apply a fluid pressure force to the deployment door 34 at the inner side surface 70. This induces stress in the stress riser 110 at the three sides 124, 126 and 128 of the deployment door 34. When the stress reaches a predetermined elevated level, the stress riser 110 ruptures so that a tear propagates throughout the length of the stress riser 110. The deployment door 34 is then released for pivotal movement about the hinge 112 from the closed position of FIG. 1 to the opened position of FIG. 2.

Figure 9:
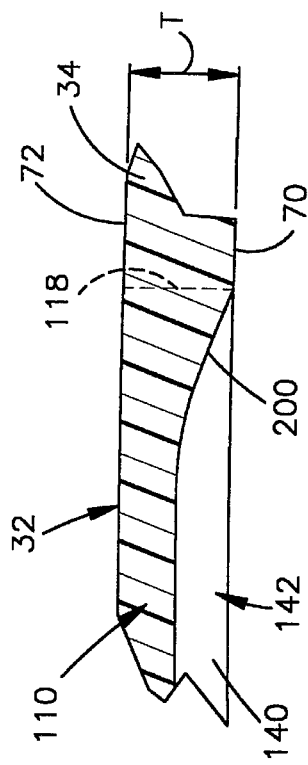
FIG. 9 is a view taken on line 9—9 of FIG. 5.

The stress riser 110 is constructed so that the tear is stopped at the terminal ends 118 and 120 of the stress riser 110. As shown in FIG. 9, the depth of the groove 142 gradually decreases to zero along the length of a tapered end portion 200 of the recessed surface 140. The stress riser 110 gradually increases in thickness along the length of the tapered end portion 200, and reaches the full thickness T of the deployment panel 32 at the terminal end 118. The stress riser 110 thus ends gradually so that stresses are distributed throughout the full thickness T at the terminal end 118 of the stress riser 110. Such distribution of stresses helps to ensure that the tear will not propagate into the deployment door 34 beyond the terminal end 118. The opposite end portion 116 (FIG. 5) of the stress riser 110 is tapered in the same manner.

Additionally, the hook-shaped paths of the opposite end portions 114 and 116 of the stress riser 110 direct the tear to propagate in directions that turn away from the hinge 112. This helps to ensure that the hinge 112 remains intact and that the bending stresses induced in the deployment door 34 are concentrated at the hinge 112. Moreover, the first and second gussets 196 and 198 are located so as to block propagation of the tear in directions extending along the hinge 112.

As described above, each of the side walls 180 and 182 of the base 36 is inclined from a vertical plane at an angle A3, and the angles A3 are equal to the deployment angle A1 of the air bag 12. Accordingly, each of the side walls 180 and 182 directs the air bag 12 to move toward and against the deployment door 34 at the deployment angle A1. The angles A2 at the mounting bosses 80 also are equal to the deployment angle A1. The fluid pressure force applied to the deployment panel 32 by the air bag 12 thus acts predominantly in a direction parallel to the axes 92 of the mounting bosses 80. This minimizes bending or twisting in the mounting bosses 80 and the fasteners 96 so that the mounting bosses 80 and the fasteners 96 remain securely connected to each other, and to the instrument panel 16, as shown in FIG. 6B. Additionally, since the angles A1, A2 and A3 are equal to each other, the mounting bosses 80 and the base 36 can be removed together from a mold cavity in a single direction. The gussets 192 are also aligned accordingly. This simplifies the process of forming the deployment door assembly 30 as a single, continuous piece of plastic material.

In accordance with an additional feature of the present invention, the corrugations 188 stiffen the base walls 180–186. The base walls 180–186, in turn, intersect and stiffen the deployment panel 32 where the undulating contour (FIG. 5) of the base 36 extends around the deployment door 34. The structure of the base 36 thus helps to prevent undesirable bending of the deployment panel 32 about the perimeter of the deployment door 34 when the air bag 12 moves forcefully against the deployment door 34. When the deployment door 34 moves pivotally from the closed position to the opened position, the plastic material of the deployment panel 32 bends fully along the length of the hinge 112 between the opposite end portions 114 and 116 of the stress riser 110. The plastic material also bends fully across the width of the hinge 112 between the deployment door 34 and the second side wall 182 of the base 36. The corrugated structure of the base 36 further helps to confine such pivotal bending to the plastic material located within the length and width of the hinge 112.

The present invention has been described with reference to a preferred embodiment. From the foregoing description of the invention, those skilled in the art will perceive improvements, changes and modifications. For example, the shapes and sizes of the deployment door and the deployment panel could vary. The deployment door assembly could have a different location on the instrument panel, such as a mid-mount location. Moreover, a vehicle occupant restraint system may include one or more air bags that inflate upon the occurrence of front, rear, and/or side impacts to the vehicle. The air bags can be mounted in parts of the vehicle other than the instrument panel. Such other parts of the vehicle include, for example, the doors, the pillars, the roof, and the seats. A deployment door assembly constructed in accordance with the present invention could be used with an air bag and the corresponding vehicle trim structure at any of those locations. Such improvements, changes and modifications within the skill of the art are intended to be covered by the appended claims.

Having described the invention, the following is claimed:

1. Apparatus for covering an inflatable occupant restraint in a vehicle, said apparatus comprising:

a part comprising a continuous piece of plastic material having a panel portion and a base portion;

said panel portion comprising means for closing an opening in a vehicle instrument panel, said panel portion having a peripheral edge surface and including means for defining boundaries of a deployment door spaced fully from said peripheral edge surface, said panel portion further having oppositely facing inner and outer side surfaces extending fully across and around said deployment door;

said base portion comprising means for defining a chute through which the inflatable restraint moves outward toward said deployment door when the inflatable restraint is inflating, said base portion being defined by a plurality of base walls which surround said deployment door and project inward from said inner side surface of said panel portion;

said base portion further comprising stiffening means for stiffening said panel portion about the perimeter of said deployment door, said stiffening means comprising a plurality of corrugations in said base walls, each of said corrugations extending inward from said inner side surface of said panel portion, said base portion thus intersecting said panel portion along an undulating path extending around said deployment door.

2. Apparatus as defined in claim 1 wherein each of said corrugations is rectangular.

3. Apparatus as defined in claim 1 wherein said outer side surface of said panel portion comprises means for continuing the trim theme of the vehicle across and around said deployment door.

4. Apparatus as defined in claim 1 wherein said part further comprises mounting means for mounting said part on the vehicle at locations spaced from said base portion, said mounting means projecting inward from said panel portion at locations between said base portion and said peripheral edge surface.

5. Apparatus as defined in claim 4 wherein said continuous piece of plastic material includes said mounting means.

6. Apparatus as defined in claim 4 wherein said mounting means mounts said part on the vehicle instrument panel.

7. Apparatus for covering an inflatable occupant restraint in a vehicle, said apparatus comprising:

a part having a panel portion and a base portion;

said panel portion having a peripheral edge surface and including means for defining boundaries of a deployment door spaced fully from said peripheral edge surface;

said base portion comprising means for directing the inflatable restraint to move outward toward said deployment door when the inflatable restraint is inflating, said base portion being defined by a plurality of corrugated base walls which surround said deployment door and project inward from said panel portion;

said base portion defining a chute through which the inflatable restraint moves outward toward said deployment door, said chute having an open inner end spaced from said panel portion, each of said base walls having a plurality of corrugations extending inward from said panel portion toward said open inner end of said chute, said base portion thus intersecting said panel portion along an undulating path extending around said deployment door.

8. Apparatus as defined in claim 7 wherein each of said corrugations is rectangular.

* * * * *